Sept. 22, 1936.  L. VIETH  2,055,187

PHONOGRAPH REPRODUCER

Filed Sept. 29, 1934

INVENTOR
L. VIETH
BY
ATTORNEY

Patented Sept. 22, 1936

2,055,187

UNITED STATES PATENT OFFICE 2,055,187

PHONOGRAPH REPRODUCER

Leonard Vieth, Jackson Heights, N. Y., assignor to Bell Telephone Laboratories, Incorporated, New York, N. Y., a corporation of New York Application September 29, 1934, Serial No. 746,028

9 Claims. (Cl. 179—100.41)

This invention relates to phonograph reproducers and more particularly to universal electric reproducers for playing either hill and dale or lateral cut phonograph records.

Devices of this type have been proposed heretofore. Some of these prior devices were provided with separate styli for the two types of grooves and it was necessary for the user to turn the reproducer on its supporting arm or to perform some other operation to bring the proper stylus for the record to be played into operating position. Single stylus devices have also been proposed but even these must be selectively positioned according to the type of record to be played.

The object of this invention is an electric phonograph reproducer with a single stylus capable of operating indiscriminately on either of the above types of record to give high quality reproduction.

In the moving system of a phonograph reproducer according to this invention, a plurality of mechanically coupled members connect the stylus to the generating element in such a way that either lateral or vertical vibratory forces applied to the stylus cause the element to move in the same generating mode. The generating element, preferably a coil and the stylus are mounted on a crank member and this assembly is supported by suitable springs for constraining the element to move only in the proper generating mode. One spring or set of springs free to move vertically and torsionally but not laterally supports the assembly so that it is free to deflect both vertically and laterally is attached to the assembly near the stylus.

When the mechanical constants of this vibratory system, as determined by other considerations, are such as to produce objectionable resonances within the operating range of frequencies, a flat response characteristic may be obtained by using suitable damping means such as a small block of highly dissipative rubber, or the like, as one of the mechanically coupled elements.

According to a further feature of the invention, rotation of the generating element under vertical driving forces is minimized by proportioning the moving system to keep the center of mass as nearly as possible in vertical alignment with the stylus.

In one embodiment of the invention a coil mounted on the upper end of a vertical tubular member is supported in the air-gap of a magnetic circuit by a spring of relatively high lateral stiffness and the coil is driven by a stylus in a T-shaped crank resiliently held with one horizontal arm of the crank in contact with the lower end of the tubular member. Rubber or other damping material may be conveniently inserted at this point of contact and the stiffnesses of the several springs are so proportioned with respect to each other and to the mass of the several connecting elements that contact is maintained at this point under all operating conditions.

In a somewhat simpler construction the crank member is in the form of an inverted L, the coil is connected to the horizontal arm either rigidly or through a dissipative element and the system is supported by vertically spaced springs on the line of the vertical axis of the crank.

The several features of the invention will be more clearly understood from the following detailed description and the accompanying drawings in which.

Figure 1:
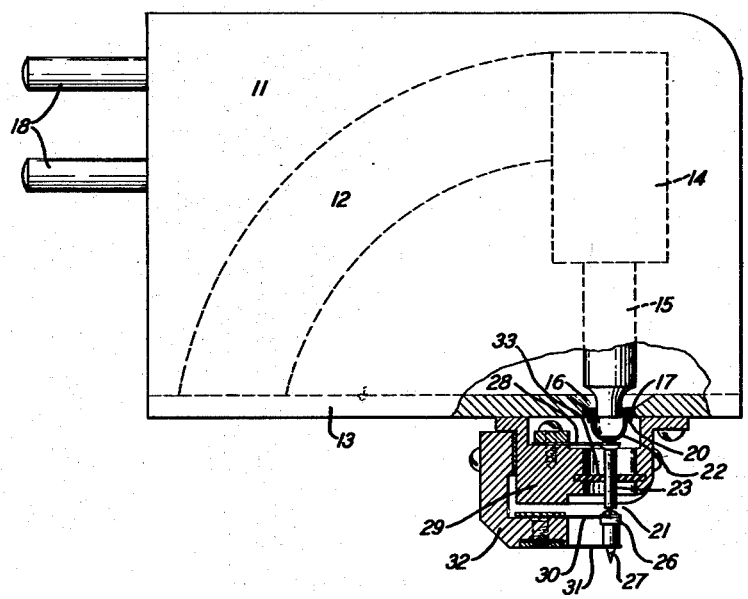
Fig. 1 is a side view partly in section of a reproducer according to the invention.

Referring now to Fig. 1, the reproducer casing 11 houses a magnetic circuit comprising a magnet 12, a horizontal pole-piece 13 and a vertical pole-piece 14 having a lower portion 15 of reduced circular cross-section which extends into the hole 16 in the pole-piece 14 to define an annular gap 17. The terminals 18, 18 are connected to the leads 19, 19 of the coil 20 and serve to connect the reproducer both mechanically and electrically to its supporting arm.

Figure 3:
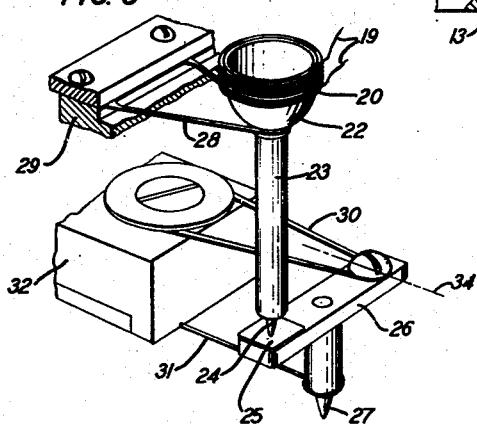
Fig. 3 is an enlarged perspective view of the moving system of the reproducer of Fig. 1.

The moving system 21 shown more clearly in Fig. 3, comprises a coil 20 on a light duralumin cup 22 which is mounted on the upper end of a duralumin tube 23. This tube has a somewhat pointed end 24 resting on a block 25 of highly dissipative rubber (or other suitable damping material) which is secured to a T crank 26 having a permanent stylus 27 for engaging the grooves of a record. In this particular structure it is convenient to place the damping material in the location shown but in modified designs it may be more effective in other places in the mechanical system coupling the coil to the stylus. It could be located, for example, between the cup member 22 and the tube 23 or between the stylus 27 and the crank 26 as the case requires.

The coil assembly is held in operating position in the gap 17 by a cantilever spring 28 clamped to a removable mounting block 29 on the reproducer housing as shown and the crank is constrained by cantilever springs 30 and 31 clamped to a mounting block 32 which is removably secured to the block 29 so that either the crank assembly or the crank and coil assemblies may be removed as a unit without disturbing the rest of the reproducer. The mounting block 29 is preferably made in two parts so that the moving systems can be assembled with a disc 33 of rubber or other resilient material around the tube 23 and engaging a recess in the block. This disc stabilizes the coil assembly and by its damping action suppresses resonances and permits the use of a very thin light weight tube.

As will be readily seen from their configuration all three mounting springs 28, 30 and 31 are free to deflect vertically, springs 28 and 30 are also free to deflect torsionally, but not laterally, and spring 31 is free to deflect laterally as well as vertically. When the reproducer is cooperating with a hill and dale record, the stylus 27 and the crank assembly vibrates vertically and drives the coil assembly in a vertical mode, to generate currents in the coil corresponding to the stylus vibrations.

When the reproducer is cooperating with a lateral cut record spring 31 is deflected laterally, the spring 30 is deflected torsionally and the crank 26 vibrates about the axis 34 at the spring end of the crank. Under this condition the other horizontal end of the crank vibrates substantially vertically; the coil assembly is restrained against lateral motion by the disc 33 and the upper spring 28 and since the connection between the damping block 25 and the point 24 is not rigid, the coil is driven in a vertical mode as before.

The stiffnesses of the several springs as pointed out above, should be correlated to each other and to the mass of the moving part to insure a positive drive from the crank 26 to the tube 23 at all frequencies keeping in mind, of course, that the stylus point mechanical impedance of the whole system should be as low as possible for all frequencies of interest. The total mass of all the vibrating parts and the stiffnesses of the supporting springs should therefore be kept as low as possible. In one embodiment of the invention as shown in Fig. 3 which gives high quality reproduction from either type of record, the vibrating parts have a mass of about 40 milligrams, the arms of the spring 28 are 10 mils wide and 1.5 mils thick, the corresponding dimensions of spring 30 are 15 mils and 3 mils, respectively, and the lower spring 31 is made from 5-mil piano wire.

Figure 2:
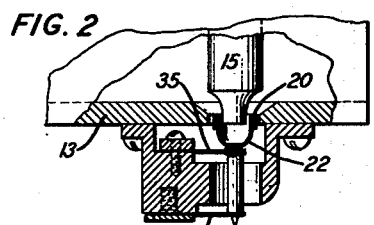
Fig. 2 is a sectional view of a modified form of moving system for the reproducer of Fig. 1.
Figure 4:
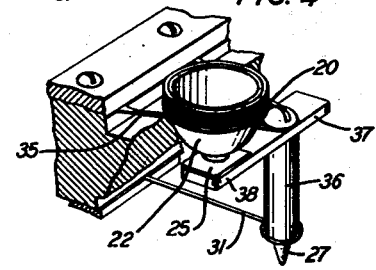
Fig. 4 is an enlarged perspective view of the moving system of Fig. 2.

In the alternate construction shown in Figs. 2 and 4 the cup 22 supporting the coil 20 is mounted directly on the damping block 25 and only two supporting springs 31 and 35 are used. The crank 36 may be T-shaped as before or the overhanging arm 37 may be somewhat shortened to further reduce the moving system mass. Theoretically this arm should be such as to balance the arm 38 and the coil assembly so that the center of mass of the moving system is in vertical alignment with the stylus to prevent rotation of the coil 20 under vertical driving forces at the stylus 27. In practice, however, it may be desirable in order to keep the mass low, to tolerate a slight unbalance of the arms 37 and 38 as shown.

The operation of this device is very similar to that of the one already described. On vertical records springs 31 and 35 both deflect vertically and the coil is driven vertically as before; on lateral cut records spring 31 is deflected laterally and spring 35 torsionally to provide a fulcrum for the crank 36. Since the coil in this construction is rigidly connected to the crank, its vibrations will be through an arc rather than along its vertical axis, but inasmuch as the coil is relatively close to the crank and the amplitude of vibration is small, the deviation of the coil from a straight line is very small and its effect is negligible.

From the foregoing description it will be apparent that a reproducer with a moving system of either of the types described can be used to play either hill and dale records without requiring any attention on the part of the user as to which type of record is being used.

While the invention has been described with reference to electrodynamic structures, it will be understood that the general principles of the invention are equally applicable to electromagnetic, electrostatic or piezoelectric crystal type reproducers and that various other modifications of the design may be made within the scope of the following claims.

What is claimed is:

1. In a universal reproducer, a stylus, a coil, a crank connecting member holding the coil in lateral and vertical spaced relation to the stylus and spaced spring supports connected to the member above the stylus, the lower spring being free to deflect both laterally and vertically and the upper spring being free both vertically and torsionally but of relatively high stiffness for lateral deflections.

2. In a universal reproducer, a stylus, a coil, a crank member holding the coil in vertical and lateral spaced relation to the stylus, a spring support attached to the member near the stylus and free to deflect both laterally and vertically, and upper spring supporting means free to deflect vertically for vertical vibrations of the stylus and free to deflect torsionally to form a fulcrum for the member when the stylus is vibrating laterally.

3. In a reproducer, a moving system comprising a coil, a stylus for driving the coil, a stylus arm and a highly dissipative member forming a flexible connection between the coil and the stylus and spaced parallel springs supporting the moving system.

4. In a universal reproducer, a generating element and a stylus in vertical and lateral spaced relation, a crank having vertical and horizontal arms connecting the stylus to the element and a plurality of resilient means differing in lateral stiffness secured to the vertical arm for supporting the crank for vertical and torsional vibrations whereby the generating element is driven in the same mode by lateral and vertical stylus vibrations.

5. In a universal reproducer, a magnetic circuit including a gap, a generating element in the gap, a stylus vertically and laterally displaced from the element, connecting members including a crank having vertical and horizontal arms between the stylus and the element, and a vertically and torsionally resilient spring supporting the crank at the junction of the arms for vertical and lateral vibrations of the stylus.

6. In a phonograph reproducer, a stylus, a coil vertically and laterally displaced from the stylus, a crank for transmitting stylus vibrations to the coil and a plurality of spring supports of different lateral stiffness secured to and constraining the crank so that the coil vibrates in the same mode whether the reproducer is playing hill and dale or lateral cut records.

7. In a universal reproducer, a moving system comprising a crank having vertical and horizontal arms, a stylus in the vertical arm, a coil, a dissipative member connecting the coil to the horizontal arm and a plurality of cantilever springs resiliently supporting the crank for vertical and lateral vibrations of the stylus.

8. In a universal reproducer, a magnet system having an air-gap, a coil within the gap, a T-shaped crank having a stylus in its vertical arm, a member connected to the coil and contacting one horizontal arm of the crank, a spring resiliently supporting the member for vertical vibrations, and means for supporting the crank comprising an upper spring of relatively high lateral stiffness, and a lower spring of low stiffness for vertical and lateral deflections.

9. In a phonograph reproducer the combination with a stationary structure and a moving system comprising a stylus, a coil vertically and laterally displaced from the stylus and a crank for transmitting stylus vibrations to the coil, of a plurality of spring supports for the moving system and means for securing the supports together to form for the system a mounting which may be secured to and removed from the stationary structure as a unit.

LEONARD VIETH.